TOUCH RESPONSIVE OSCILLATOR AND CONTROL CIRCUITS

Filed Feb. 6, 1964

INVENTORS
CARL E. ATKINS
ROBERT L. ZIOLKOWSKI
BY
Eyre, Mann & Lucas
ATTORNEYS 3,254,313
TOUCH RESPONSIVE OSCILLATOR AND CONTROL CIRCUITS Carl E. Atkins, Montclair, and Robert L. Ziolkowski, South Plainfield, N.J., assignors to Tung-Sol Electric Inc., a corporation of Delaware Filed Feb. 6, 1964, Ser. No. 342,940
4 Claims. (Cl. 331—111)

The present invention relates to touch responsive control circuits and provides an oscillator which can be selectively triggered into and out of oscillation by contacting certain of its circuit elements to add capacity to the oscillator.

In accordance with the present invention, this oscillator comprises a three terminal semiconductor switching device with a first capacitor which is connected between its gate and collector and which is charged through a charging circuit to a potential which back biases the semiconductor switching device non-conducting and with a second capacitor which is connected between its emitter and collector and which is charged through a second charging circuit, at a slower rate than the first capacitor, until the resulting potential exceeds the potential on the first capacitor thereby biasing the semiconductor switching device conductive. With this arrangement, both capacitors charge while the charge on the first capacitor back biases the semiconductor switching device non-conducting. When the second capacitor thereafter biases the semiconductor switching device conductive the charge on both capacitors is discharged through the semiconductor switching device until the current flow through the semiconductor switching device falls below the sustaining level whereupon current flow through the semiconductor switching device stops and the capacitors start recharging through their respective charging circuits to initiate another cycle.

This oscillator can be adjusted so that it can be triggered in and out of oscillation by very small changes in the capacity of either of the first and second capacitors, permitting its use to detect body capacity in touch responsive circuits.

For a better understanding of this invention and of the advantages thereof, reference should be had to the accompanying drawings of which:

Figures 1, 2, 3:
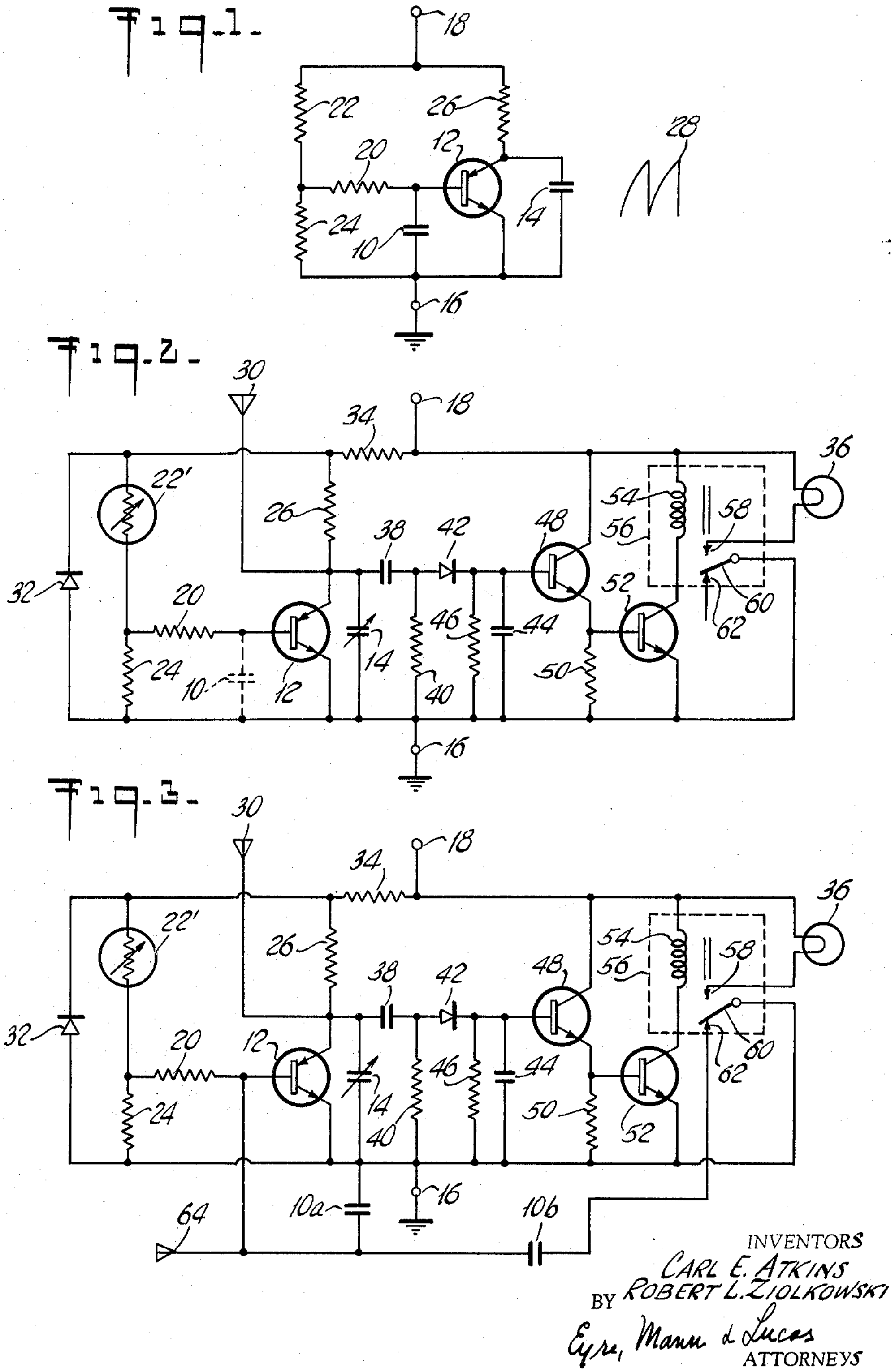
FIGURE 1 is an electrical schematic diagram of oscillator employing the present invention.
FIGURE 2 is a single touch circuit employing the present invention.
FIGURE 3 is a two touch circuit employing the present invention.

As shown in FIGURE 1, a first capacitor 10 is connected between the gate and collector of a four layer NPNP semiconductor switching device 12, such as a TS 1595, and a second capacitor 14 is connected between the emitter and collector of the same semiconductor switching device.

The semiconductor switching device 12 and the capacitors 10 and 14 are coupled across the terminals 16 and 18 of a 12 volt D.C. source such as a car battery. The collector and one side of each of the capacitors 10 and 14 are connected to the negative, or grounded terminal 16. The gate and the other side of the capacitor 10 are connected through a resistor 20 to the output of a divider network consisting of two resistors 22 and 24 connected in series between the positive and negative terminals 18 and 16, and the emitter and the other side of capacitor 14 are connected to the positive terminal 18 by a resistor 26.

When the power is turned on in this circuit, current flows from the positive terminal 18 through the resistors 22 and 24 to charge the capacitor 10 towards the potential at the output of the divider network. Current also flows through resistor 26 to charge capacitor 14, at a slower rate than capacitor 10, towards the full twelve volts of the D.C. source. Initially, because the capacitor 10 is charging at a faster rate than capacitor 14, the potential at the gate is greater than that at the emitter. Therefore, the semiconductor switching device 12 is rendered non-conducting. However, the potential on the emitter will eventually exceed the potential on the gate, since the capacitor 10 charges towards the potential at the output of the divider network while the capacitor 14 charges towards the full potential of the D.C. source. When the potential at the emitter exceeds the potential at the gate, the semiconductor switching device 12 breaks down and conducts, discharging the capacitors 10 and 14 towards the potential at the negative terminal 16. Eventually, during this discharging of the capacitors, the current flow through the semiconductor switching device 12 falls below the sustaining level and the semiconductor switching device is rendered non-conducting. This allows the capacitors 10 and 14 to charge again starting another cycle. This oscillation of the circuit results in a series of saw-tooth variations 28 in the potential across capacitor 14.

It has been found that, by adjustment, the oscillation of this circuit can be switched on and off by very small changes in the capacity of capacitors 10 and 14. This is apparently because, as the potential at the emitter starts to exceed the potential at the gate, charge starts leaking off capacior 14 through the semiconductor switching device to the capactior 10 and therefore unless capacitor 14 is large enough to supply charge to the capacitor 10 in addition to the sustaining current for the semiconductor switching device 12 oscillation is inhibited.

With this in mind, capacitors 10 and 14 can be selected to provide touch responsive operation in a touch responsive circuit. FIGURE 2 is a touch responsive circuit employing the oscillator described above adjusted for touch responsive operation. In this circuit, the oscillator is normally not oscillating and when a touch responsive element 30 is contacted it triggers the oscillator into oscillation. This is done by decreasing the capacity of capacitor 14 until it is insufficient to maintain oscillation in the oscillator. Then when the touch responsive contact 30 is touched, it adds sufficient body capacity in shunt with capacitor 14 to initiate and sustain oscillation.

In the circuit in FIGURE 2, a separate capacitor 10 is not employed. Instead only the inherent capacity between the gate and the collector is used to back bias the gate off. Also, resistor 22′ is a thermistor to provide a fair amount of compensation for changes with temperature in the firing current requirements of the semiconductor switching device. In addition, the voltage supplied to the oscillator is regulated by a zener diode 32 connected in shunt with resistors 22′ and 24 and a resistor 34 connected between the positive terminal 18 and the point where resistors 22′ and 26 are joined. Voltage regulation is particularly important where this circuit is used in automotive applications since the voltage supplied by the battery and generator of an automobile may vary from between 10 and 15 volts and seriously affect oscillation.

A capacitor 38 an a resistor 40 are connected in series between the emitter of the semiconductor switching device 12 and the grounded terminal 16. The capacitor 38 blocks the steady state voltage across the capacitor 14 whether the oscillator is oscillating or not. However, the capacitor 38 allows the saw-tooth pulses 28 to reach the anode of the diode 42 connected thereto when the the oscillator is oscillating. The positive portion of the pulses pass through the diode 42 to charge a capacitor 44, connected between the cathode of the diode and the grounded terminal 16. When the oscillator is not oscillating, the charge on this capacitor 44 discharges towards ground through a resistor 46 connected in shunt therewith.

The potential across the capacitor 44 is employed in biasing a transistor 48 whose base is connected to the cathode of diode 42 along with one side of capacitor 44. Transistor 48 may be, and preferably is, an N-P-N silicon transistor. The collector of this transistor 48 is connected to the positive terminal 18 and the emitter of the transistor is connected through a resistor 50 to the negative terminal 16. Therefore, the potential across resistor 50 increases and decreases with the potential across the capacitor 44.

The resistor 50 is connected between the base and emitter of a similar second transistor 52 whose collector is connected to the positive terminal 18 through the coil 54 of a relay 56. Normally the current flow through the resistor 50 is insufficient to energize the relay 56. However, when the touch responsive element is contacted and the oscillator starts oscillating, the resultant current flow through resistor 50 biases the transistor 52 sufficiently conductive to energize the relay 56.

A load, represented by a lamp 36, is connected between the positive terminal 18 and a normally open contact 58 of the relay. The armature 60 for that contact is connected to terminal 16. Therefore, the load 36 remains unenergized until the touch responsive element 30 is contacted and the relay is thereby energized, whereupon the armature 60 contacts the normally open contact 58 and the load 36 is energized. The load 36 becomes deenergized when touch is removed from the touch responsive element 30 since the capacity between the emitter and collector is insufficient to maintain the oscillations necessary to keep the relay 56 energized.

By slight modification the circuit of FIGURE 2 can be made so that the load 36 will remain energized after touch is removed from the touch responsive element and will become deenergized when a second touch responsive element is contacted. Such a circuit is shown in FIGURE 3. In this circuit, the capacitance between the gate and collector of the semiconductor switching device 12 includes capacitor 10*a* connected directly between the gate and collector and capacitor 10*b* connected between the gate and collector in series with a normally closed contact 62 and the armature 60.

As in the circuit of FIGURE 2, in this circuit the capacity of capacitor 14 is insufficient to sustain oscillations in the oscillator. However, when the touch responsive element 30 is contacted it adds additional capacitance in shunt with capacitor 14 so that the total capacitance between the emitter and collector of the semiconductor switching device 12 is sufficient to supply charge to the total capacitance 10 between the gate and the collector and at the same time sustain current flow through the semiconductor device 12. The oscillator therefore produces saw-tooth oscillations across the capacitor 14 which, as in the circuit of FIGURE 2, are rectified by the diode 42 to provide a positive potential across the capacitor 44.

This positive potential biases the transistor 48 more conductive increasing the voltage across resistor 50. The increased voltage across resistor 50 biases the transistor 52 more conductive allowing sufficient current to energize the relay 56 to flow through the coil 54 of the relay. With energization of the relay the armature is lifted off its normally closed contact 62 and pressed against its normally open contact 58, completing the circuit through the load 36 to energize the load and at the same time remove capacitor 10*b* from between the gate and collector of the semiconductor device 12.

When touch is removed from touch responsive element 30, the oscillator will still oscillate. This is because, the capacity of the capacitor 14 is sufficient to maintain oscillation in the oscillator with capacitor 10*b* removed. Therefore, the oscillator maintains the relay 56 energized and, as a result of this, the load 36 remains energized.

To deenergize the load, a second touch responsive element 64 is provided. When this touch responsive element is contacted it adds capacitance between the gate and the collector of the semiconductor switching device 12, so that the capacity of capacitor 14 is then insufficient to supply charge to the total capacitance between the gate and the collector and at the same time sustain current flowing through the semiconductor switching device 12 thus ending oscillation by the oscillator. This, of course, deenergizes the relay 56, returning the armature 60 to its position against the normally closed contact 62. With the armature against the normally closed contact 62, the load is deenergized and the capacitor 10*b* is connected between the gate and the collector of the semiconductor switching device 12. Therefore, when touch is removed from the touch responsive element 64 the oscillator is back to its normal condition and will not oscillate leaving the load 36 deenergized.

Obviously, a number of changes can be made in the described circuits without departing from the spirit and scope of the invention. Therefore, it is understood that this is intended to cover all variations in the above circuits which are within the spirit and scope of the claims.

What is claimed is:

1. A touch responsive circuit comprising a semiconductor switching device having a gate, an emitter, and a collector, electrical capacity between the gate and the collector, first resistive means for charging the electrical capacity between the gate and collector to a potential sufficient to back bias the semiconductor switching device nonconducting, electrical capacity between the emitter and collector, second resistive means for charging the electrical capacity between the emitter and collector to a level which is insufficient to trigger said semiconductor switching device into conduction, and a touch responsive means coupled to the emitter of said semiconductor switching device so that when it is contacted it adds sufficient body capacity between the emitter and collector to cause the total capacity between the emitter and collector to be charged to a level sufficient to trigger said semiconductor switching device into conduction and thereby discharge the charge on the capacity between the gate and the collector whereby the semiconductor switching device will be alternately and repeatedly rendered conducting and non-conducting.

2. The touch responsive control circuit of claim 1 including a controlling means for controlling the energization and deenergization of a load, said controlling means being actuated to energize the load by the pulses of electrical potential produced across the capacity between the emitter and collector of the semiconductor switching device.

3. The touch responsive control circuit of claim 2 wherein the capacity between the gate and collector includes a capacitor which is removed from between the gate and collector by the controlling means when it is actuated by said pulses of electrical potential to reduce the capacity between the gate and collector sufficiently to permit the charge on the capacity between the emitter and collector to trigger the semiconductor switching device into conduction when touch is removed from the first touch responsive element and there is a second touch responsive element coupled to the gate of the semiconductor switching means which when contacted while the controlling means is actuated will add sufficient body capacity between the gate and collector to prevent the charge on the capacity between the emitter and collector from triggering the semiconductor switching device into conduction.

4. A touch responsive circuit comprising a semiconductor switching circuit having input, output and control terminals, electrical capacity between the control and output terminals, first resistive means for charging said capacity to a potential sufficient to back bias the semiconductor switching circuit nonconducting, electrical capacity between the input and output terminals, second resistive means for charging said last mentioned capacity to a level which is insufficient to trigger said semiconductor switching circuit into conduction, and a touch responsive means coupled to the input terminal of said semiconductor switching circuit so that when it is contacted it adds sufficient body capacity between the input and the output terminals to cause the total capacity between the input and output terminals to be charged to a level sufficient to trigger said semiconductor switching circuit into conduction and thereby discharge the charge on the capacity between the control and output terminals whereby the semiconductor switching circuit will be alternately and repeatedly rendered conducting and nonconducting.

References Cited by the Examiner

UNITED STATES PATENTS

| | | | |
|---|---|---|---|
| 2,890,353 | 6/1959 | Van Overbeek et al. | 331—111 |
| 3,153,153 | 10/1964 | Jones et al. | 331—172 |

ROY LAKE, *Primary Examiner.*

JOHN KOMINSKI, *Examiner.*